Patented Apr. 14, 1953

2,635,166

UNITED STATES PATENT OFFICE 2,635,166

WELDING ELECTRODE

Sven Svantesson, Stockholm, Sweden, assignor to Allmanna Svenska Elektriska Aktiebolaget, Vasteras, Sweden, a Swedish corporation No Drawing. Application June 14, 1951, Serial No. 231,670. In Sweden March 2, 1948

1 Claim. (Cl. 219—8)

The increased use of electrical welding in the mechanical industry and especially in the ship building has increased the demand for a better economy. One of the means for improving the economy has been the introduction of high efficiency electrodes, i. e. electrodes having a thick protecting coating of such a composition, that at the welding a deep crater is formed at the end of the electrode. A further improvement of the economy has also been achieved by introducing large amounts of metal powder in the coating, this powder generally having the same composition as the metal to be welded. The increased effectiveness achieved by these high efficiency electrodes depends to the largest extent on the fact, that a crater is formed at the welding, which in its turn will give rise to a larger arc voltage and thus to the development of a larger power in the arc, so that the electrode melts rapidly. The improvement of the economy, however, depends only to a small degree upon the saving in energy, but it depends chiefly on the gain of time achieved in welding with such electrodes. Experience has, however, shown, that the weld metal achieved from such thick coated electrodes will not have the same mechanical strength as the weld achieved by hitherto known electrodes with a relatively thin coating. This depends upon that when welding with heavy coated electrodes, the weld metal will contain inclusions of slag and gases such as oxygen and hydrogen. The fact that the heavy coated electrodes will give inferior slag and gas separation than medium (ordinary thick coated) and thin coated electrodes is probably dependent upon that when welding with heavy coated electrodes with corresponding larger power, the weld bath will be deeper and the cover of slag will be thicker.

The present invention concerns a high efficiency electrode which is not combined with the above mentioned disadvantages, and is chiefly characterized thereby that the core wire of the welding electrode is made from a steel with a comparatively high carbon content, i. e. with a carbon content between 0.13–0.25%, and that the coating of the welding electrode contains metal powder, suitably iron powder, to an extent from 20–80%, and thereby that the total cross section of the electrode is between 4 to 9 times that of the core wire. By the fact that according to the invention the carbon content in the core wire is chosen so high as mentioned above, a larger development of carbon-oxides in the welding bath is attained than when hitherto common electrodes are used, and this gas development will cause a larger stirring of the welding bath and thus a better separation of slag and gas bubbles. As a consequence, a considerably denser and a purer weld metal is achieved, giving a considerably higher mechanical strength.

Comparing tests have proved that with the high carbon content in electrodes having a considerable amount of iron powder in the coating a much better weld metal is attained than with a lower carbon content in the core wire, in that a high carbon content makes the material tougher, and also the impact strength is considerably increased. This is clear from the following comparing tests made with two different core wire diameters 4 mm. and 5 mm. The coating had a thickness so that the total cross section of the electrode was 5 times that of the core wire and the content of iron powder in the coating was 68% by weight.

| Core wire diameter | 4 mm. | 4 mm. | 5 mm. | 5 mm. |
|---|---|---|---|---|
| Carbon content | 0.09% | 0.15% | 0.07% | 0.16–0.21%. |
| Mean value of | four tests | three tests | four tests | two tests. |
| Yield point, kg./mm.$^2$ | 44.7 | 42.9 | 42.5 | 41.2. |
| Ultimate strength, kg./mm.$^2$ | 47.6 | 44.7 | 48.3 | 46.3. |
| Elongation, percent on $5 \times d$ | 19.8 | 28.3 | 16.9 | 27.1. |
| Contraction, percent | 42.9 | 49.3 | 34.1 | 49.2. |
| Impact strength, kgm./cm.$^2$, Charpy | 7.5 | 8.1 | 7.6 | 9.4. |
| Hardness Brinell, $H_B$ | 132 | 124 | 134 | 128. |

The invention is not limited to a certain composition of the coating, in that the coating may have any known composition and contain e. g. kaolin, asbestos, quartz, titanium dioxides, silicates of different kinds, and different carbonates, e. g. chalk spar, dolomite, iron spar and manganese carbonate, all or a part of these substances in a suitable relation, and as a binder suitably sodium or potassium water glass is used. It is also suitable to incorporate a small amount of organic compositions in the coating in order to serve, on one hand as a binder, and on the other hand to give a gas protection. In a known manner, the coating also may contain desired alloy metals, e. g. chromium, nickel and manganese, besides of the above mentioned content of iron powder. So may, for instance, an electrode intended to give a weld metal having a normal manganese content for mild steels contain 4% manganese as metal or alloy, suitably ferromanganese.

I claim as my invention:

Welding electrode for electric arc welding of unalloyed or low-alloyed iron or steel, comprising a core wire having a carbon content of 0.13–0.25%, and a coating comprising coating material and a binder and containing iron powder between 20% and 80%, the thickness of the coating being so large that the total cross-section of the electrode is between 4 to 9 times the cross-section of the core wire.

SVEN SVANTESSON.

References Cited in the file of this patent

UNITED STATES PATENTS

| Number | Name | Date |
|---|---|---|
| 1,745,267 | Pennington | Jan. 28, 1930 |
| 2,009,240 | Roberts et al. | July 23, 1935 |
| 2,408,619 | Friedlander | Oct. 1, 1946 |
| 2,429,175 | Van de Willigen et al. | Oct. 14, 1947 |

FOREIGN PATENTS

| Number | Country | Date |
|---|---|---|
| 394,319 | Great Britain | June 9, 1933 |
| 417,195 | Great Britain | Oct. 1, 1934 |
| 553,371 | Great Britain | May 19, 1943 |